United States Patent
Seo et al.

(10) Patent No.: US 7,988,589 B2
(45) Date of Patent: Aug. 2, 2011

(54) GEAR TRAIN OF AUTOMATIC TRANSMISSION FOR VEHICLE

(75) Inventors: Kang Soo Seo, Suwon (KR); Hyu Tae Shim, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 370 days.

(21) Appl. No.: 12/263,181

(22) Filed: Oct. 31, 2008

(65) Prior Publication Data
US 2009/0124449 A1 May 14, 2009

(30) Foreign Application Priority Data

Nov. 9, 2007 (KR) .................. 10-2007-0114306

(51) Int. Cl.
*F16H 3/44* (2006.01)

(52) U.S. Cl. ...................................................... 475/284

(58) Field of Classification Search .................. 475/269, 475/280, 284, 285, 330
See application file for complete search history.

(56) References Cited

U.S. PATENT DOCUMENTS

| | | | | |
|---|---|---|---|---|
| 6,887,178 B2 * | 5/2005 | Miyazaki et al. | ............. | 475/276 |
| 7,029,416 B2 * | 4/2006 | Miyazaki et al. | ............. | 475/275 |
| 7,402,119 B2 * | 7/2008 | Kamada et al. | ............... | 475/282 |

FOREIGN PATENT DOCUMENTS

KR 10-0559336 B1 3/2006

* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A gear train of an automatic transmission for a vehicle according to an exemplary embodiment of the present invention includes a first planetary gear set, a second planetary gear set composed of two simple planetary gear sets, three clutches, and two brakes, and thus the gear train of an automatic transmission may realize six forward speeds and one reverse speed.

18 Claims, 5 Drawing Sheets

FIG. 2

|    | C1 | C2 | C3 | B1 | B2 | F1 |
|----|----|----|----|----|----|----|
| D1 | ●  |    |    | ○  |    | ●  |
| D2 | ●  |    |    |    | ●  |    |
| D3 | ●  | ●  |    |    |    |    |
| D4 | ●  |    | ●  |    |    |    |
| D5 |    | ●  | ●  |    |    |    |
| D6 |    |    | ●  |    | ●  |    |
| R1 |    | ●  |    | ●  |    |    |

GEAR TRAIN OF AUTOMATIC TRANSMISSION FOR VEHICLE

CROSS-REFERENCE TO RELATED APPLICATION

The present application claims priority to Korean Patent Application No. 10-2007-0114306 filed Nov. 9, 2007, the entire contents of which is incorporated herein for all purposes by this reference

BACKGROUND OF THE INVENTION

1. Field of the Invention

The present invention relates to a gear train of an automatic transmission for a vehicle including a simple planetary gear set, a compound planetary gear set, three clutches, and two brakes, and thus, the gear train of an automatic transmission of the present invention may realize six forward speeds and one reverse speed.

2. Description of Related Art

A typical shift mechanism of an automatic transmission utilizes a combination of a plurality of planetary gear sets. A gear train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

For a manual transmission, too many speeds cause a driver the inconvenience of excessive manual shifting. However, for an automatic transmission, a transmission control unit automatically executes shifting by controlling the operation of the gear train, and therefore more speeds usually implies more merit.

A four speed automatic transmission or a five-speed automatic transmission has been widely used, but nowadays, a six-speed automatic transmission is increasingly used.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for a vehicle including a first planetary gear set, a second planetary gear set formed of two combined simple planetary gear sets, three clutches, and two brakes, and thus, the gear train of an automatic transmission may realize six forward speeds and one reverse speed.

In an aspect of the present invention, a gear train of an automatic transmission for a vehicle may include a first planetary gear set that is a simple planetary gear set and includes a first rotational element that is connected to a transmission housing and operated as a fixed element, a second rotational element that forms an intermediate output path outputting a reduced rotational speed of an input shaft, and a third rotational element that is directly connected with the input shaft and forms an input path, a second planetary gear set that is formed by combining first and second simple planetary gear sets, has four rotational elements, and includes a fourth rotational element that is one of the rotational elements of the first and second simple planetary gear sets, is directly connected to the second rotational element, and forms a first intermediate input path, a fifth rotational element that is one of the rotational elements of the first and second simple planetary gear sets, is connected to an output shaft, and is operated as an output element, a sixth rotational element that includes two rotational elements, which are directly connected each other, of the first and second simple planetary gear sets, is variably connected with the input shaft to form a variable input path, and is variably connected to the transmission housing to be operated as a fixed element, and a seventh rotational element that includes two rotational elements, which are variably connected or separated to/from each other, of the first and second simple planetary gear sets, is variably connected with the second rotational element to form a second intermediate input path, and is variably connected to the transmission housing to be operated as a fixed element, and/or a plurality of friction members including clutches and brakes that selectively connect the rotational elements of the first and second planetary gear sets to each other or to the transmission housing.

The first planetary gear set may be a single pinion planetary gear set, the first rotational element is a first sun gear, the second rotational element is a first planet carrier, and the third rotational element is a first ring gear, the first simple planetary gear set of the second planetary gear set is a single pinion planetary gear set including a second sun gear, a second planetary carrier, and a second ring gear, and the second simple planetary gear set of the second planetary gear set is a double pinion planetary gear set including a third sun gear, a third planetary carrier, and a third ring gear, and/or the fourth rotational element is the third sun gear, the fifth rotational element is the second ring gear, the sixth rotational element is the second planet carrier and the third ring gear, and the seventh rotational element is the second sun gear and the third planet carrier.

The plurality of friction members may include a first clutch that selectively connects the seventh rotational element, a second clutch disposed on the second intermediate input path, a third clutch disposed on a variable input path connected to the input path, a one-way clutch and a first brake disposed in parallel between the sixth rotational element and the transmission housing, and/or a second brake disposed between the seventh rotational element and the transmission housing.

The first clutch and the one-way clutch may be operated in a first forward speed, the first clutch and the second brake may be operated in a second forward speed, the first clutch and the second clutch may be operated in a third forward speed, the first clutch and the third clutch may be operated in a fourth forward speed, the second clutch and the third clutch may be operated in a fifth forward, the third clutch and the second brake may be operated in a sixth forward speed, and/or the second clutch and the first brake may be operated in a reverse speed.

The third clutch operated for the sixth rotational element may be disposed between the third ring gear and the input shaft, and the one-way clutch and the first brake may be disposed between the second planet carrier and the transmission housing.

The first clutch operated for the seventh rotational element may be disposed between the second sun gear and the third planet carrier, and the second brake may be disposed between the second clutch and the second sun gear.

The first clutch may be disposed between the first and second planetary gear sets, the first and second brakes, and the one-way clutch may be disposed around the first clutch, the second clutch may be disposed in front of the first planetary gear set, and the third clutch may be disposed in rear of the second planetary gear set.

The first planetary gear set may be a single pinion planetary gear set, the first rotational element may be a first sun gear, the second rotational element may be a first planet carrier, and the third rotational element may be a first ring gear, the first simple planetary gear set of the second planetary gear set is a double pinion planetary gear set including a second sun gear, a second planetary carrier, and a second ring gear, and the second simple planetary gear set of the second planetary gear set is a single pinion planetary gear set including a third sun gear, a third planetary carrier, and a third ring gear, and/or the fourth rotational element is the second sun gear, the fifth rotational element is the third ring gear, the sixth rotational element is the second ring gear and the third planet carrier, and the seventh rotational element is the second planet carrier and the third sun gear.

The third clutch operated for the sixth rotational element may be disposed between the second ring gear and the input shaft, and the one-way clutch and the first brake may be disposed between the third planet carrier and the transmission housing.

The first clutch operated for the seventh rotational element may be disposed between the second planet carrier and the third sun gear, the second clutch may be disposed between the second rotational element and the third sun gear, and the second brake may be disposed between the second clutch and the third sun gear.

The first and third clutches may be disposed between the first planetary gear set and the first simple planetary gear set, the first and second brakes and the one-way clutch may be disposed between the first and second simple planetary gear sets, and the second clutch may be disposed in front of the first planetary gear set.

The first forward speed may be realized when the reduced rotational speed of the first planetary gear set is transmitted to the second planetary gear set via the intermediate output path and the first intermediate input path, the sixth rotational element is operated as a fixed element, and the fifth rotational element is operated as the output element.

The second forward speed may be realized when the reduced rotational speed of the first planetary gear set is transmitted to the second planetary gear set via the intermediate output path and the first intermediate input path, the seventh rotational element is operated as a fixed element, and the fifth rotational element is operated as the output element.

The third forward speed may be realized when the reduced rotational speed of the first planetary gear set is transmitted to the second planetary gear set via the intermediate output path and the first and second intermediate input paths, and the fifth rotational element is operated as the output element.

The fourth forward speed may be realized when the reduced rotational speed of the first planetary gear set is transmitted to the second planetary gear set via the intermediate output path and the first intermediate input path, a rotational speed of the input shaft is transmitted to the second planetary gear set via the variable input path, and the fifth rotational element is operated as the output element.

The fifth forward speed may be realized when the reduced rotational speed of the first planetary gear set is transmitted to the second planetary gear set via the second intermediate input path, a rotational speed of the input shaft is transmitted to the second planetary gear set via the variable input path, and the fifth rotational element is operated as the output element.

The sixth forward speed may be realized when a rotational speed of the input shaft is transmitted to the second planetary gear set via the variable input path, the seventh rotational element is operated as a fixed element, and the fifth rotational element is operated as the output element.

The reverse speed may be realized when the reduced rotational speed of the first planetary gear set is transmitted to the second planetary gear set via the second intermediate input path, the sixth rotational element is operated as a fixed element, and the fifth rotational element is operated as the output element.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart of friction members employed in an exemplary gear train according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
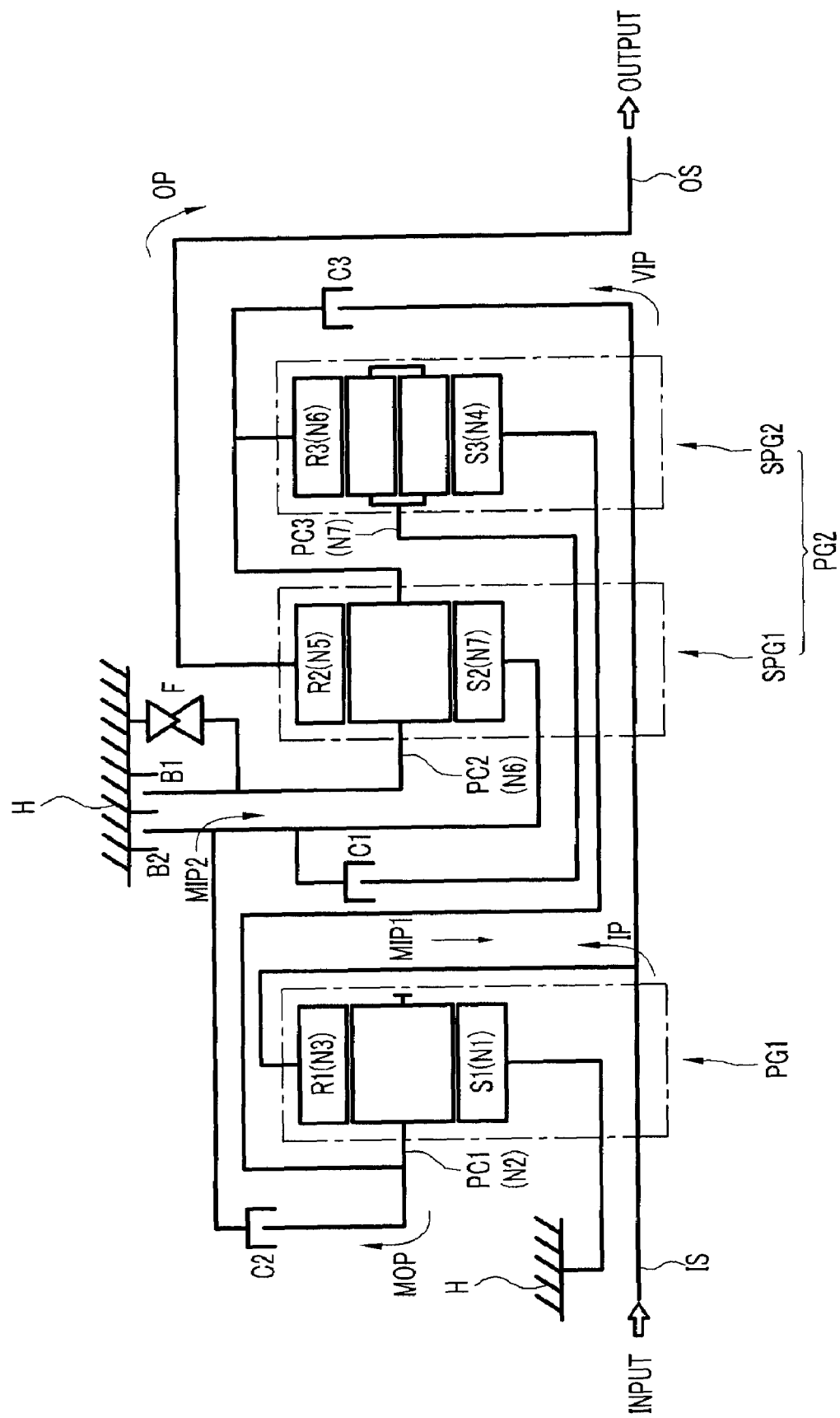
FIG. 1 is a schematic diagram of an exemplary gear train according to the present invention.

FIG. 1 is a schematic diagram of a gear train according to a first exemplary embodiment of the present invention, and the gear train includes first and second planetary gear sets PG1 and PG2 that are disposed on the same shaft axis line, three clutches C1, C2, and C3, and two brakes B1 and B2.

The first planetary gear set PG1 receives a rotational speed from an input shaft IS, reduces the rotational speed and transmits the rotational speed to the second planetary gear set PG2, and the second planetary gear set PG2 receives the reduced rotational speed from the first planetary gear set PG1 directly or indirectly and the rotational speed of the input shaft IS selectively, and outputs six forward speeds and one reverse speed though an output shaft OS.

The first planetary gear set PG1 is closely disposed to an engine, and then the second planetary gear set PG2 is sequentially disposed.

The input shaft IS is an input member and indicates a turbine shaft in a torque converter (not shown). The input shaft IS receives a converted engine torque from the torque converter, and the output shaft OS is an output member that outputs a drive torque to vehicle wheels through an output gear and a differential.

The first planetary gear set PG1 is a simple planetary gear set of a single pinion planetary gear set, and includes a first sun gear S1 as a first rotational element N1, a first planet carrier PC1 as a second rotational element N2, and a first ring gear R1 as a third rotational element N3.

The first rotational element (N1; the first sun gear S1) is directly connected to a transmission housing H and operated as a fixed element.

The second rotational element (N2; the first planet carrier PC1) forms an intermediate output path MOP outputting a reduced rotational speed.

The third rotational element (N3; the first ring gear R1) is directly connected with the input shaft IS and forms an input path IP by being an input element.

The second planetary gear set PG2 is formed by first and second simple planetary gear sets SPG1 and SPG2, and includes fourth, fifth, sixth, and seventh rotational elements N4, N5, N6, and N7. In various embodiments of the present invention, the first simple planetary gear set SPG1 is a single pinion planetary gear set and the second simple planetary gear set SPG2 is a double pinion planetary gear set.

In the connection of the first and second simple planetary gear sets SPG1 and SPG2, the second planet carrier PC2 is directly connected with the third ring gear R3 and the second sun gear S2 is variably connected with the third planet carrier PC3 by interposing the first clutch C1.

The third sun gear S3 is indicated as the fourth rotational element N4, the second ring gear R2 is indicated as the fifth rotational element N5, the second planet carrier PC2 and the third ring gear R3 are indicated as the sixth rotational element N6, and the second sun gear S2 and the third planet carrier PC3 are indicated as the seventh rotational element N7.

The fourth rotational element (N4; the third sun gear S3) is directly connected with the second rotational element N2 forming the intermediate output path MOP and forms a first intermediate input path MIP1 so that the fourth rotational element N4 receives the reduced rotational speed of the first planetary gear set PG1.

The fifth rotational element (N5; the second ring gear R2) is directly connected with the output shaft OS for operating as an output element.

The sixth rotational element (N6; the second planet carrier PC2 and the third ring gear R3) is variably connected with the input shaft IS by interposing the third clutch C3, forms a variable input path VIP, and is operated as a selective input element, and the sixth rotational element is simultaneously variably connected to the transmission housing H by interposing the first brake B1 in parallel with the one-way clutch F.

The seventh rotational element (N7; the second sun gear S2 and the third planet carrier PC3) is variably connected with the first planetary gear set PG1 by interposing the second clutch C2, forms a second intermediate input path MIP2, and simultaneously is variably connected to the transmission housing H by interposing the second brake B2.

The third clutch C3 operated for the sixth rotational element N6 is disposed between the third ring gear R3 and the input shaft IS, and the one-way clutch F and the first brake B1 are disposed between the second planet carrier PC2 and the transmission housing H.

The first clutch C1 is disposed between the second sun gear S2 and the third planet carrier PC3, the second clutch C2 is disposed between the second rotational element N2 and the second sun gear S2, and the second brake B2 is disposed between the second clutch C2 and the second sun gear S2.

The first, second, and third clutches C1, C2, and C3 and the first and second brakes B1 and B2 can be enabled as multi-plate hydraulic pressure friction devices that are frictionally engaged by hydraulic pressure.

In various embodiments of the present invention, the first clutch C1 is disposed between the first and second planetary gear sets PG1 and PG2, and the first and second brakes B1 and B2 and the one-way clutch F are disposed around the first clutch C1.

The second clutch C2 is disposed in front of the first planetary gear set PG1 and the third clutch C3 is disposed in rear of the second planetary gear set PG2, so that distribution of weight can be uniform.

As described above, the friction members are dispersedly disposed so that hydraulic lines for supplying hydraulic pressure to the friction members can be easily formed, and also distribution of weight can be uniform so that total weight balance can be enhanced.

Figure 2:
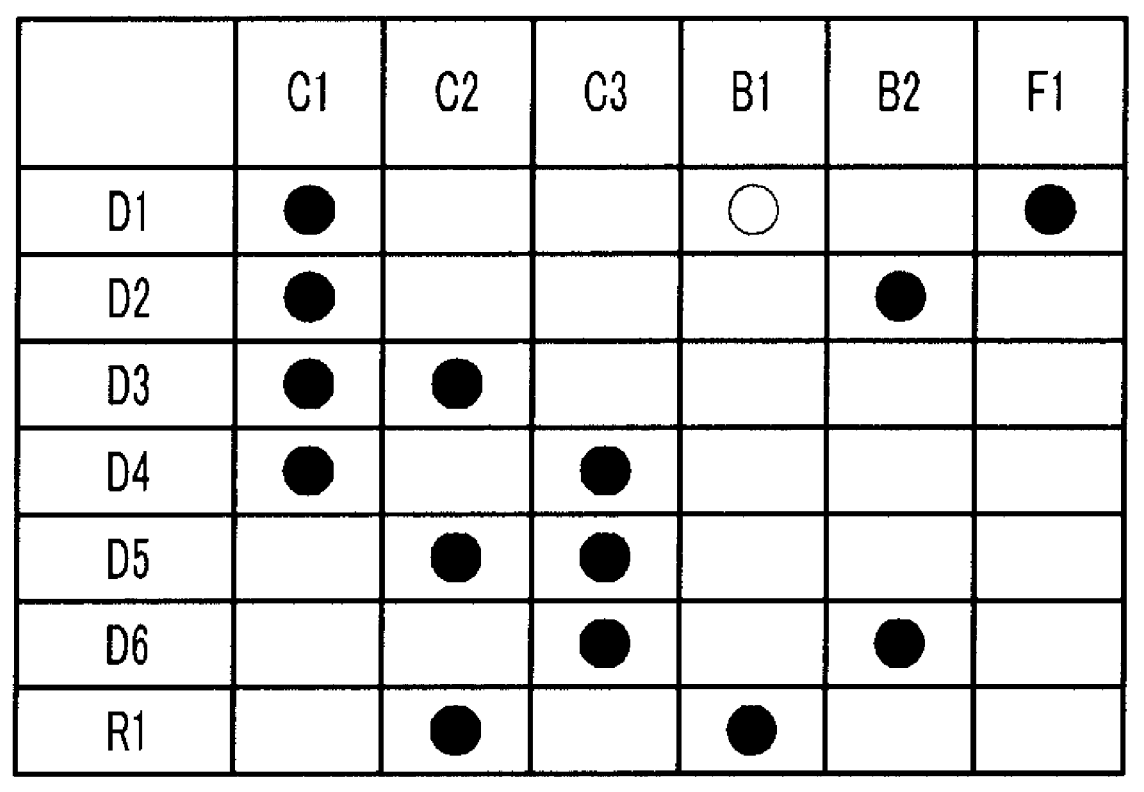

FIG. 2 is an operational chart of friction members employed in a gear train according to an exemplary embodiment of the present invention. As shown in FIG. 2, two friction elements are operated in each shift range.

In the first forward speed, the first clutch C1 and the one-way clutch F or the first brake B1 are operated, and in the second forward speed, the first clutch C1 and the second brake B2 are operated. In the third forward speed, the first clutch C1 and the second clutch C2 are operated, and in the fourth forward speed, the first clutch C1 and the third clutch C3 are operated. In the fifth forward speed, the second and third clutches C2 and C3 are operated, and in the sixth forward speed, the third clutch C3 and the second brake B2 are operated. And in the reverse speed, the second clutch C2 and the first brake B1 are operated.

Figure 3:
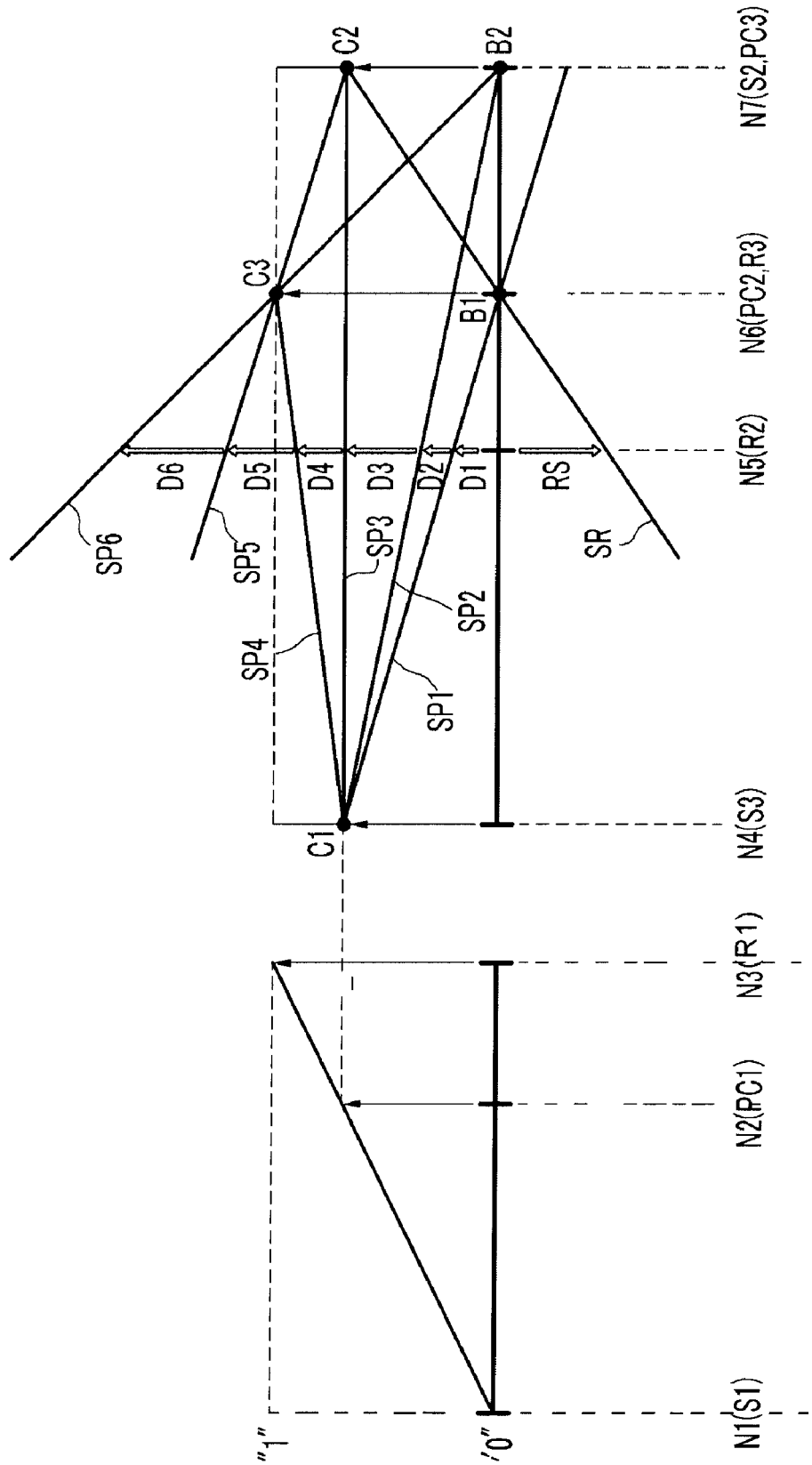
FIG. 3 is a speed diagram of an exemplary gear train according to the present invention.

FIG. 3 is a lever diagram of a gear train according to the exemplary embodiment of the present invention illustrated in FIG. 2. In FIG. 3, a lower horizontal line represents "0" rotational speed, and an upper horizontal line represents "1.0" rotational speed, which is the same as the rotational speed of the input shaft IS.

Three vertical lines of the first planetary gear set PG1 respectively represent the first rotational member N1 (the first sun gear S1), the second rotational member N2 (the first planet carrier PC1), and the third rotational member N3 (the first ring gear R1) sequentially from the left in the drawing, and a distance between them is determined according to a gear ratio (teeth number of sun gear/teeth number of ring gear) of the first planetary gear set PG1.

Four vertical lines of the second planetary gear set PG2 respectively represent the fourth rotational element (N4; the third sun gear S3), the fifth rotational element (N5; the second ring gear R2), the sixth rotational element (N6; the second planet carrier PC2 and the third ring gear R3), and the seventh rotational element (N7; the second sun gear S2 and the third planet carrier PC3) sequentially from the left in the drawing, and a distance between them is determined according to a gear ratio (teeth number of sun gear/teeth number of ring gear) of the first and second simple planetary gear sets SPG1 and SGP2, and since determining position of the rotational elements is obvious to a person skilled in the art, a detailed explanation will be omitted.

Hereinafter, shifting processes of the gear train according to the above-described exemplary embodiment of the present invention will be explained.

First Forward Speed

In the first forward speed, as shown in FIG. 2, the first clutch C1 and the one-way clutch F are operated.

In the first planetary gear set PG1, as shown in FIG. 3, the third rotational element N3 receives a rotational speed of input shaft (IS), the first rotational element N1 is operated as a fixed element, and the second rotational element N2 outputs a reduced rotational speed.

The reduced rotational speed of the second rotational element N2 is transmitted to the fourth rotational element N4.

In the second planetary gear set PG2, the sixth operational element N6 is operated as a fixed element by operation of the one-way clutch F, and a first forward speed line SP1 connecting the fourth rotational element N4 and the sixth rotational element N6 is formed. Thus, the final output speed of the gear train becomes a height D1 of the first forward speed line SP1 at the position of the fifth rotational element N5, and thus the first forward speed shifting is realized.

Second Forward Speed

In the second forward speed, the first brake B1, which is operated in the first forward speed, is released and the second brake B2 is operated.

At the same input state of the first forward speed, the seventh rotational element N7 is operated as a fixed element by operation of the second brake B2, and a second forward speed line SP2 connecting the fourth rotational element N4 and the seventh rotational element N7 is formed. Thus, the final output speed of the gear train becomes a height D2 of the second forward speed line SP2 at the position of the fifth rotational element N5, and thus the second forward speed shifting is realized.

Third Forward Speed

In the third forward speed, the second brake B2, which is operated in the second forward speed, is released and the second clutch C2 is operated.

The reduced rotational speed of the second rotational element N2 is transmitted to the fourth rotational element N4, and the seventh rotational element N7 receives the rotational speed by operation of the second clutch C2 and the first clutch C1, and thus the second planetary gear set PG2 rotates as a whole. Also, a third forward speed line SP3 connecting the fourth rotational element N4 and the seventh rotational element N7 is formed. Thus, the final output speed of the gear train becomes a height D3 of the third forward speed line SP3 at the position of the fifth rotational element N5, and thus the third forward speed shifting is realized.

Fourth Forward Speed

In the fourth forward speed, the second clutch C2, which is operated in the third forward speed, is released and the third clutch C3 is operated.

The rotational speed of the first planetary gear set PG1 is transmitted to the fourth rotational element N4, and the rotational speed of the input shaft IS is transmitted to the sixth rotational element N6 by operation of the third clutch C3. Also, a fourth forward speed line SP4 connecting the fourth rotational element N4 and the sixth rotational element N6 is formed. Thus, the final output speed of the gear train becomes a height D4 of the fourth forward speed line SP4 at the position of the fifth rotational element N5, and thus the fourth forward speed shifting is realized.

Fifth Forward Speed

In the fifth forward speed, the first clutch C1, which is operated in the fourth forward speed, is released and the second clutch C2 is operated.

The rotational speed of the input shaft IS is transmitted to the sixth rotational element N6 by operation of the third clutch C3, and the reduced rotational speed of the first planetary gear set PG1 is transmitted to the seventh rotational element N7 by operation of the second clutch C2. Also, a fifth forward speed line SP5 connecting the sixth rotational element N6 and the seventh rotational element N7 is formed. Thus, the final output speed of the gear train becomes a height D5 of the fifth forward speed line SP5 at the position of the fifth rotational element N5, and thus the fifth forward speed shifting is realized.

Sixth Forward Speed

In the sixth forward speed, the second clutch C2, which is operated in the fifth forward speed, is released and the second brake B2 is operated.

In the second planetary gear set PG2, the rotational speed of the input shaft IS is transmitted to the sixth rotational element N6 by operation of the third clutch C3, and the seventh rotational element N7 is operated as a fixed element by operation of the second brake B2. Also, the sixth forward speed line SP5 connecting the sixth rotational element N6 and the seventh rotational element N7 is formed. Thus, the final output speed of the gear train becomes a height D6 of the sixth forward speed line SP6 at the position of the fifth rotational element N5, and thus the sixth forward speed shifting is realized.

Reverse Speed

In the reverse speed, the first clutch C2 and the first brake B1 are operated.

In the first planetary gear set PG1, the third rotational element N3 receives the rotational speed of input shaft (IS), the first rotational element N1 is operated as a fixed element, and the second rotational element N2 outputs the reduced rotational speed.

In the second planetary gear set PG2, the rotational speed of the second rotational element N2 is transmitted to the seventh rotational element N7 by operation of the second clutch C2, and the sixth rotational element N6 is operated as a fixed element by operation of the first brake B1. Thus, a reverse speed line SR is formed, and so the final output speed of the gear train becomes a height SR of the reverse speed line SR at the position of the fifth rotational element N5, and thus the reverse speed shifting is realized.

In the fifth and sixth forward speeds and the reverse speed, the first clutch C1 is not operated so that interference of the second sun gear S2 and the third planet carrier PC3 does not occur. Thus, in the fifth forward speed and the reverse speed, the rotational speed is transmitted to the second sun gear S2 and in the sixth forward speed, the second sun gear S2 is operated as a fixed element.

In this exemplary embodiment of the present invention, the first planetary gear set PG1 is formed by a simple planetary gear set including three rotational elements, and the first rotational element N1 is operated as a fixed element, the second rotational element N2 is operated as an intermediate output element, and the third rotational element N3 is operated as an input element of the input shaft (IS).

The second planetary gear set PG2 is combined by the first and second simple planetary gear sets SPG1 and SPG2, which have three rotational elements respectively.

The fourth rotational element N4 is one rotational element of the second simple planetary gear set SPG2.

The fifth rotational element N5 is one rotational element of the first simple planetary gear set SPG1.

The sixth rotational element N6 is combined by one rotational element of another two rotational elements of the first simple planetary gear set SPG1 and one rotational element of another two rotational elements of the second simple planetary gear set SPG2, wherein the two rotational elements are directly connected.

The seventh rotational element N7 is combined by the other one rotational element of the first simple planetary gear set SPG1 and the other one rotational element of the second simple planetary gear set SPG2, wherein the two rotational elements are variably connected.

The fourth rotational element N4 is directly connected with the second rotational element N2 of the first planetary gear set PG1, and is operated as the intermediate output element in the first, second, third, and fourth forward speeds.

The fifth rotational element N5 is connected to the output shaft OS and operated as the output element.

The sixth rotational element N6 is variably connected to the input shaft IS, simultaneously variably connected to the transmission housing H, operated as the input element in the fourth, fifth, and sixth forward speeds, and operated as the fixed element in the first forward speed and the reverse speed.

The two rotational elements forming the seventh rotational element N7 are variably connected to each other by clutch C1, so that the two rotational elements selectively rotate as a whole, or are separated from each other. Also, the two rotational elements are variably connected with the second rotational element N2 by clutch C2 and with the transmission housing H by brake B2 so that the two rotational elements are operated as fixed elements in the second and sixth forward speeds, and operated as input elements in the third and fifth forward speeds and the reverse speed.

As shown in FIG. 3, in the first forward speed, the first clutch C1 is operated, the fourth rotational element N4 is operated as an input element, and the sixth rotational element N6 is operated as a fixed element by operation of the one-way clutch F.

In the second forward speed, the fixed element is changed to the seventh rotational element N7 by operation of the second brake B2.

In the third forward speed, the second brake B2, which is operated in the second forward speed, is released and the second clutch C2 is operated so that reduced rotational speed of the first planetary gear set PG1 is transmitted via both the fourth rotational element N4 and the seventh rotational element N7, the second planetary gear set PG2 rotates as a whole, and the same rotational speed is output.

In the fourth forward speed, the second clutch C2, which is operated in the third forward speed, is released and the third clutch C3 is operated. Thus, different rotational speeds are transmitted to the fourth rotational element N4 and the sixth rotational element N6 so that shifting to the fourth forward speed is realized by complementary operation.

In the fifth forward speed, the first clutch C1, which is operated in the fourth forward speed, is released so that the connection of the second sun gear S2 and the third planet carrier PC3 is released. Thus, different rotational speeds are transmitted to the sixth rotational element N6 and the seventh rotational element N7 so that shifting to the fifth forward speed is realized by complementary operation.

In the sixth forward speed, the second clutch C2, which is operated in the fifth forward speed, is released and the second brake B2 is operated. Thus, the fixed element is changed to the seventh rotational element N7 and shifting to the sixth forward speed is realized.

In the reverse speed, a reduced rotational speed is transmitted to the seventh rotational element N7 by operation of the second clutch C2, the sixth rotational element N6 is operated as a fixed element, and reverse rotational speed is output.

In the fifth and sixth forward speeds and the reverse speed, the first clutch C1 is released and the connection of the second sun gear S2 and the third planet carrier PC3 is released. Thus, even if two rotational elements receive rotational speeds, the second planetary gear set PG2 does not rotate as a whole and shifting procedures are achieved.

Figure 4:
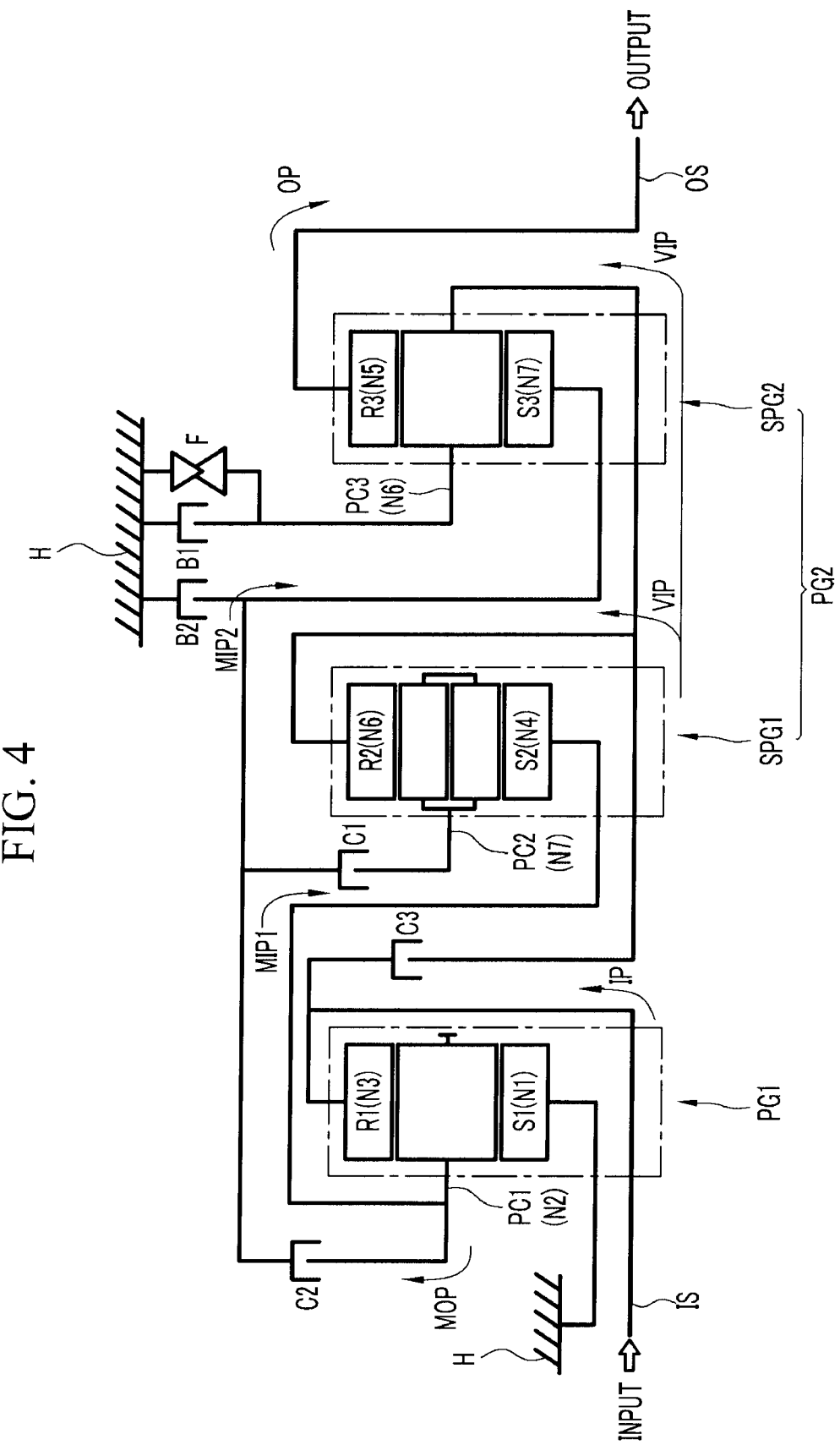
FIG. 4 is a schematic diagram of an exemplary gear train according to the present invention.

FIG. 4 is a schematic diagram of a gear train according to another exemplary embodiment of the present invention. The first planetary gear set PG1 is the same as the above-described exemplary embodiment of the present invention, however, a scheme of the second planetary gear set PG2 is changed differently from the above-described exemplary embodiment of the present invention.

That is, in the above-described exemplary embodiment, the first simple planetary gear set SPG1 is a single pinion planetary gear set and the second simple planetary gear set SPG2 is a double pinion planetary gear set. However, in this exemplary embodiment, the first simple planetary gear set SPG1 is a double pinion planetary gear set and the second simple planetary gear set SPG2 is a single pinion planetary gear set.

In connection of the first and second simple planetary gear sets SPG1 and SPG2, the second ring gear R2 is directly connected with the third planet carrier PC3 and the second planet carrier PC2 is variably connected with the third sun gear S3 by interposing the first clutch C1.

Thus, the second sun gear S2 is indicated as the fourth rotational element N4, the third ring gear R3 is indicated as the fifth rotational element N5, the second ring gear R2 and the third planet carrier PC3 are indicated as the sixth rotational element N6, and the second planet carrier PC2 and the third sun gear S3 are indicated as the seventh rotational element N7.

The fourth rotational element (N4; the second sun gear S2) is directly connected with the second rotational element N2 forming the intermediate output path MOP, and forms a first intermediate input path MIP1 so that the fourth rotational element N4 receives the reduced rotational speed of the first planetary gear set PG1.

The fifth rotational element (N5; the third ring gear R3) is directly connected with the output shaft OS for operating as an output element.

The sixth rotational element (N6; the second ring gear R2 and the third planet carrier PC3) is variably connected with the input shaft IS by interposing the third clutch C3, forms a variable input path VIP, and is operated as a selective input element, and the sixth rotational element is simultaneously variably connected to the transmission housing H by interposing the first brake B1 in parallel with the one-way clutch F.

The seventh rotational element (N7; the second planet carrier PC2 and the third sun gear S3) is variably connected with the first planetary gear set PG1 by interposing the second clutch C2, forms a second intermediate input path MIP2, and simultaneously is variably connected to the transmission housing H by interposing the second brake B2.

The third clutch C3 operated for the sixth rotational element N6 is disposed between the second ring gear R2 and the input shaft IS, and the one-way clutch F and the first brake B1 are disposed between the third planet carrier PC3 and the transmission housing H.

The first clutch C1 is disposed between the second planet carrier PC2 and the third sun gear S3, the second clutch C2 is disposed between the second rotational element N2 and the third sun gear S3, and the second brake B2 is disposed between the second clutch C2 and the third sun gear S3.

The first and third clutches C1 and C3 are disposed between the first planetary gear set PG1 and the first simple planetary gear set SPG1, the first and second brakes B1 and B2 and the one-way clutch F are disposed between the first and second simple planetary gear sets SPG1 and SPG2, and the second clutch C2 is disposed forward the first planetary gear set PG1.

Shifting operations of this exemplary embodiment remain the same as those of the above-described exemplary embodiment, and so detailed descriptions of shifting operations will be omitted.

Figure 5:
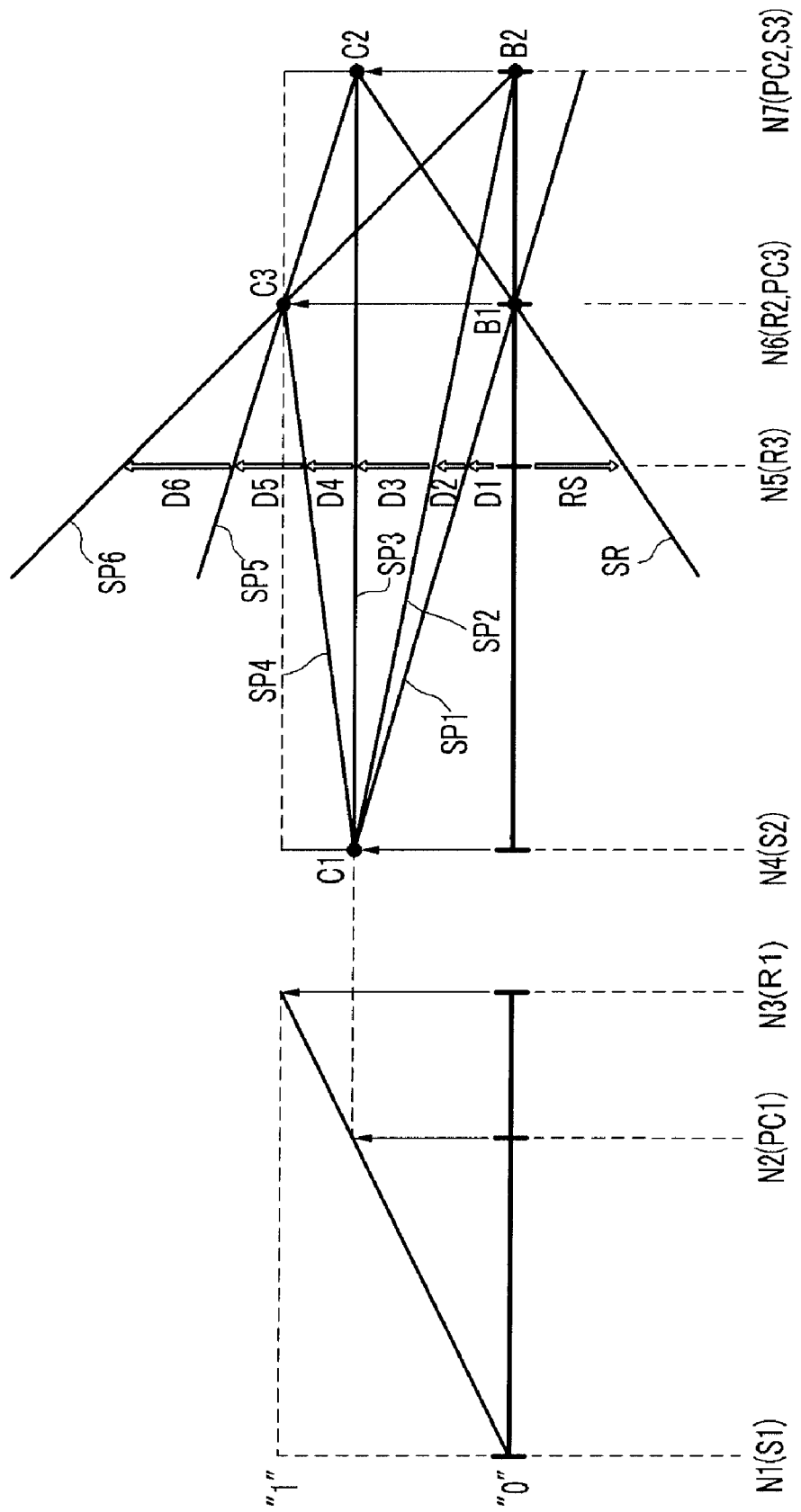
FIG. 5 is a speed diagram of an exemplary gear train according to the present invention.

That is, operations of the friction elements of this and various exemplary embodiments remain the same as those of the first exemplary embodiment as shown in FIG. 2, except for constituent elements of the fourth, fifth, sixth, and seventh rotational element N4, N5, N6, and N7 as shown in FIG. 5.

The gear train of an automatic transmission for a vehicle according to various aspects of the present invention is formed by a simple planetary gear set, a compound planetary gear set, three clutches, and two brakes, and may realize six forward speeds and one reverse speed. Fuel mileage can be improved and the number of friction elements can be minimized so that hydraulic lines may be easily constructed. In each shifting step, two friction elements are operated so that a small hydraulic pump can be used and hydraulic pressure control efficiency can be improved.

For convenience in explanation and accurate definition in the appended claims, the terms "upper", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle, comprising:
   a first planetary gear set that is a simple planetary gear set and comprises a first rotational element that is connected to a transmission housing and operated as a fixed element, a second rotational element that forms an intermediate output path outputting a reduced rotational speed of an input shaft, and a third rotational element that is directly connected with the input shaft and forms an input path;
   a second planetary gear set that is formed by combining first and second simple planetary gear sets, has four rotational elements, and comprises:
      a fourth rotational element that is one of the rotational elements of the first and second simple planetary gear sets, is directly connected to the second rotational element, and forms a first intermediate input path;
      a fifth rotational element that is one of the rotational elements of the first and second simple planetary gear sets, is connected to an output shaft, and is operated as an output element;
      a sixth rotational element that includes two rotational elements, which are directly connected each other, of the first and second simple planetary gear sets, is variably connected with the input shaft to form a variable input path, and is variably connected to the transmission housing to be operated as a fixed element; and
      a seventh rotational element that includes two rotational elements, which are variably connected or separated to/from each other, of the first and second simple planetary gear sets, is variably connected with the second rotational element to form a second intermediate input path, and is variably connected to the transmission housing to be operated as a fixed element; and
   a plurality of friction members including clutches and brakes that selectively connect the rotational elements of the first and second planetary gear sets to each other or to the transmission housing;
   wherein the first planetary gear set is a single pinion planetary gear set, the first rotational element is a first sun gear, the second rotational element is a first planet carrier, and the third rotational element is a first ring gear;
   the first simple planetary gear set of the second planetary gear set is a single pinion planetary gear set comprising a second sun gear, a second planetary carrier, and a second ring gear, and the second simple planetary gear set of the second planetary gear set is a double pinion planetary gear set comprising a third sun gear, a third planetary carrier, and a third ring gear; and
   the fourth rotational element is the third sun gear, the fifth rotational element is the second ring gear, the sixth rotational element is the second planet carrier and the third ring gear, and the seventh rotational element is the second sun gear and the third planet carrier.

2. The gear train of an automatic transmission for a vehicle of claim 1, wherein the first forward speed is realized when the reduced rotational speed of the first planetary gear set is transmitted to the second planetary gear set via the intermediate output path and the first intermediate input path, the sixth rotational element is operated as a fixed element, and the fifth rotational element is operated as the output element.

3. The gear train of an automatic transmission for a vehicle of claim 1, wherein the second forward speed is realized when the reduced rotational speed of the first planetary gear set is transmitted to the second planetary gear set via the intermediate output path and the first intermediate input path, the seventh rotational element is operated as a fixed element, and the fifth rotational element is operated as the output element.

4. The gear train of an automatic transmission for a vehicle of claim 1, wherein the third forward speed is realized when the reduced rotational speed of the first planetary gear set is transmitted to the second planetary gear set via the intermediate output path and the first and second intermediate input paths, and the fifth rotational element is operated as the output element.

5. The gear train of an automatic transmission for a vehicle of claim 1, wherein the fourth forward speed is realized when the reduced rotational speed of the first planetary gear set is transmitted to the second planetary gear set via the intermediate output path and the first intermediate input path, a rotational speed of the input shaft is transmitted to the second planetary gear set via the variable input path, and the fifth rotational element is operated as the output element.

6. The gear train of an automatic transmission for a vehicle of claim 1, wherein the fifth forward speed is realized when the reduced rotational speed of the first planetary gear set is transmitted to the second planetary gear set via the second intermediate input path, a rotational speed of the input shaft is transmitted to the second planetary gear set via the variable input path, and the fifth rotational element is operated as the output element.

7. The gear train of an automatic transmission for a vehicle of claim 1, wherein the sixth forward speed is realized when a rotational speed of the input shaft is transmitted to the second planetary gear set via the variable input path, the seventh rotational element is operated as a fixed element, and the fifth rotational element is operated as the output element.

8. The gear train of an automatic transmission for a vehicle of claim 1, wherein the reverse speed is realized when the reduced rotational speed of the first planetary gear set is transmitted to the second planetary gear set via the second intermediate input path, the sixth rotational element is operated as a fixed element, and the fifth rotational element is operated as the output element.

9. A passenger vehicle comprising the gear train of the automatic transmission for a vehicle of claim 1.

10. The gear train of an automatic transmission for a vehicle of claim 1, wherein the plurality of friction members comprise:
   a first clutch that selectively connects the seventh rotational element;
   a second clutch disposed on the second intermediate input path;
   a third clutch disposed on a variable input path connected to the input path;
   a one-way clutch and a first brake disposed in parallel between the sixth rotational element and the transmission housing; and
   a second brake disposed between the seventh rotational element and the transmission housing.

11. The gear train of an automatic transmission for a vehicle of claim 10, wherein:
   the first clutch and the one-way clutch are operated in a first forward speed;
   the first clutch and the second brake are operated in a second forward speed;
   the first clutch and the second clutch are operated in a third forward speed;
   the first clutch and the third clutch are operated in a fourth forward speed;
   the second clutch and the third clutch are operated in a fifth forward;
   the third clutch and the second brake are operated in a sixth forward speed; and
   the second clutch and the first brake are operated in a reverse speed.

12. The gear train of an automatic transmission for a vehicle of claim 10, wherein the third clutch operated for the sixth rotational element is disposed between the third ring gear and the input shaft, and the one-way clutch and the first brake are disposed between the second planet carrier and the transmission housing.

13. The gear train of an automatic transmission for a vehicle of claim 10, wherein the first clutch operated for the seventh rotational element is disposed between the second sun gear and the third planet carrier, and the second brake is disposed between the second clutch and the second sun gear.

14. The gear train of an automatic transmission for a vehicle of claim 10, wherein the first clutch is disposed between the first and second planetary gear sets, the first and second brakes, and the one-way clutch are disposed around the first clutch, the second clutch is disposed in front of the first planetary gear set, and the third clutch is disposed in rear of the second planetary gear set.

15. A gear train of an automatic transmission for a vehicle, comprising:
   a first planetary gear set that is a simple planetary gear set and comprises a first rotational element that is connected to a transmission housing and operated as a fixed element, a second rotational element that forms an intermediate output path outputting a reduced rotational speed of an input shaft, and a third rotational element that is directly connected with the input shaft and forms an input path;
   a second planetary gear set that is formed by combining first and second simple planetary gear sets, has four rotational elements, and comprises:
      a fourth rotational element that is one of the rotational elements of the first and second simple planetary gear sets, is directly connected to the second rotational element, and forms a first intermediate input path;
      a fifth rotational element that is one of the rotational elements of the first and second simple planetary gear sets, is connected to an output shaft, and is operated as an output element;
      a sixth rotational element that includes two rotational elements, which are directly connected each other, of the first and second simple planetary gear sets, is variably connected with the input shaft to form a variable input path, and is variably connected to the transmission housing to be operated as a fixed element; and
      a seventh rotational element that includes two rotational elements, which are variably connected or separated to/from each other, of the first and second simple planetary gear sets, is variably connected with the second rotational element to form a second intermediate input path, and is variably connected to the transmission housing to be operated as a fixed element; and
   a plurality of friction members including clutches and brakes that selectively connect the rotational elements of the first and second planetary gear sets to each other or to the transmission housing;
   wherein:
      the first planetary gear set is a single pinion planetary gear set, the first rotational element is a first sun gear, the second rotational element is a first planet carrier, and the third rotational element is a first ring gear;
      the first simple planetary gear set of the second planetary gear set is a double pinion planetary gear set comprising a second sun gear, a second planetary carrier, and a second ring gear, and the second simple planetary gear set of the second planetary gear set is a single pinion planetary gear set comprising a third sun gear, a third planetary carrier, and a third ring gear; and
      the fourth rotational element is the second sun gear, the fifth rotational element is the third ring gear, the sixth rotational element is the second ring gear and the third planet carrier, and the seventh rotational element is the second planet carrier and the third sun gear.

16. The gear train of an automatic transmission for a vehicle of claim 15, wherein the third clutch operated for the sixth rotational element is disposed between the second ring gear and the input shaft, and the one-way clutch and the first brake are disposed between the third planet carrier and the transmission housing.

17. The gear train of an automatic transmission for a vehicle of claim 15, wherein the first clutch operated for the seventh rotational element is disposed between the second planet carrier and the third sun gear, the second clutch is disposed between the second rotational element and the third sun gear, and the second brake is disposed between the second clutch and the third sun gear.

18. The gear train of an automatic transmission for a vehicle of claim 15, wherein
the first and third clutches are disposed between the first planetary gear set and the first simple planetary gear set, the first and second brakes and the one-way clutch are disposed between the first and second simple planetary gear sets, and the second clutch is disposed in front of the first planetary gear set.

* * * * *